United States Patent [19]

Koike et al.

[11] Patent Number: 4,740,428

[45] Date of Patent: Apr. 26, 1988

[54] FIBER-REINFORCED METALLIC MEMBER

[75] Inventors: Seiichi Koike, Kawagoe; Tohru Ohta, Asaka; Toshinobu Hata, Tokyo, all of Japan

[73] Assignee: Honda Giken Kogyo Kabushiki Kaisha, Tokyo, Japan

[21] Appl. No.: 855,062

[22] Filed: Apr. 23, 1986

[30] Foreign Application Priority Data

| | | | |
|---|---|---|---|
| Apr. 24, 1985 | [JP] | Japan | 60-86533 |
| Apr. 24, 1985 | [JP] | Japan | 60-60178[U] |
| Apr. 24, 1985 | [JP] | Japan | 60-60179[U] |
| Apr. 27, 1985 | [JP] | Japan | 60-62628[U] |

[51] Int. Cl.[4] .................. B32B 15/01; B32B 15/14; B32B 15/20

[52] U.S. Cl. .................. 428/549; 428/564

[58] Field of Search .................. 428/549, 553, 556, 564, 428/565; 75/229

[56] References Cited

U.S. PATENT DOCUMENTS

| | | | |
|---|---|---|---|
| 3,047,383 | 7/1962 | Slayter | 428/549 |
| 3,432,295 | 3/1969 | Frank et al. | 428/549 |
| 3,536,458 | 10/1970 | Storchheim | 428/553 |
| 3,719,519 | 3/1973 | Perugini | 428/564 |
| 3,864,093 | 2/1975 | Wolfla | 428/564 |
| 3,889,348 | 6/1975 | Lenelson | 428/549 |
| 4,012,204 | 3/1977 | Riewald et al. | 75/229 |
| 4,072,516 | 2/1978 | Pepper et al. | 75/229 |
| 4,141,726 | 2/1979 | Yajima et al. | 75/229 |
| 4,259,112 | 3/1981 | Dolowy, Jr. et al. | 75/229 |
| 4,290,510 | 9/1981 | Warren | 428/564 |
| 4,404,263 | 9/1983 | Hodes et al. | 428/564 |
| 4,415,363 | 11/1983 | Sanftleben et al. | 428/549 |
| 4,606,883 | 8/1986 | Wizemann et al. | 428/549 |
| 4,615,733 | 10/1986 | Kubo et al. | 75/229 |

*Primary Examiner*—John F. Terapane
*Assistant Examiner*—Eric Jorgensen
*Attorney, Agent, or Firm*—Armstrong, Nikaido, Marmelstein & Kubovcik

[57] ABSTRACT

This invention relates to a fiber-reinforced metallic member in which an essential part is reinforced by inorganic fibers. The fiber-reinforced metallic member is reinforced by means of a fiber shaped body having a low fiber volume proportion which is formed by mixing powder having the same composition as the metal forming a non-reinforced layer thereof or powder consisting of principal components of the metal with inorganic fibers, the particle diameter of the powder being 1 to 20 times as large as a diameter of the inorganic fibers, and compressing and shaping the mixture. It is also possible to place the layer which is reinforced by the fiber shaped body having a low fiber volume proportion, adjacent to the non-reinforced layer, and to increase a fiber volume proportion in the reinforced layer in the direction of separating from the adjacent reinforced layer. By employing such structure, it is possible to eliminate abrupt change of the characteristics of the materials at the boundary portion between the complex reinforced layer and the non-reinforced layer and to provide a structural member having a good durability.

10 Claims, 5 Drawing Sheets

FIBER-REINFORCED METALLIC MEMBER

BACKGROUND OF THE INVENTION

The present invention relates to a fiber-reinforced metallic member in which an essential part of the member is reinforced by inorganic fibers such as $Al_2O_3$, SiC, Carbon, etc., and more particularly to a fiber-reinforced metallic member in which improvement of a strength in a boundary portion between a base metal layer (non-reinforced layer) and a reinforced layer is contemplated.

Fiber-reinforced metal (FRM) implies a metal in which reinforcement of a base metal is contemplated by making reinforcing fibers intervene in the base metal, and as a proportion of intervening of fibers is increased, the strength is increased and a proportion of elongation thereof approaches to a proportion of elongation of the fibers. Therefore, it is possible to make the characteristics of the fiber-reinforced metal coincide with aimed values by varying a proportion of intervening of the fibers (a fiber volume proportion ($V_f$)).

However, in the event that a metallic member is locally fiber-reinforced with a high volume proportion of fibers, at the boundary portion between a base metal layer and a reinforced layer, the characteristics of the metallic member would change abruptly, and hence practically unfavorable phenomena are liable to occur. For instance, paying attention to coefficients of thermal expansion, in contrast to the fact that a coefficient of thermal expansion of Al-alloys is about $22\times10^{-6}$/°C., that of $Al_2O_3$ is $7.7\times10^{-6}$/°C., that $Al_2O_3$ is $7.7\times10^{-6}$/°C., that of of SiC is $3.1\times10^{-6}$/°C., and a coefficient of thermal expansion of inorganic fibers is very small compared with Al-alloys, so that if the metallic member is subjected to large thermal change, then a large difference in thermal expansion would occur between the base metal layer and the reinforced layer depending upon a content proportion in volume of fibers, and there is a possibility that cracks may arise in the boundary portion between the respective layers.

For the purpose of avoiding such abrupt change in characteristics, it would be effective to set a fiber volume proportion ($V_f$) in the entire reinforced layer low, or to set a fiber volume proportion ($V_f$) in the reinforced layer low in the portion adjacent to the base metal layer. However, in the case where a fiber shaped body (preform) for complexed casting is produced with or without use of a binder, for instance, through the procedure shown in FIG. 1, it is difficult to obtain a fiber shaped body having a low fiber volume proportion ($V_f$) of 10% or less, and even if one should succeed in shaping, deformation, cohesion, cracking, etc. would arise upon complexed casting (pressurized casting, vacuum casting, and the like), so that not only a desired strength cannot be realized but also a metallic member having stable quality cannot be produced. Also, it is difficult to obtain a fiber shaped body of $V_f=5\%$ through the heretofore known process.

Now, with regard to structural members for use in an internal combustion engine, reduction of weight has been positively advanced by employing light alloy materials, and especially to form moving parts such as rocker arms to be used in an overhead camshaft type valve moving mechanism and pistons of light alloy materials is effective also for the purpose of reducing an inertial force.

However, in the case of employing light alloy materials, in order to supplement the shortage of the strength it becomes necessary to increase a wall thickness or to associate a reinforcing strong member therewith. Hence, according to that counter-measure for reinforcement, large-sizing and increase of weight of moving parts would be the result, and the counter-measure contradicts the essential object of realizing reduction in size.

Especially, a shaft fitting portion of a rocker arm which fits around a rocker arm shaft is required to have high fatigue strength, rigidity and abrasion-proofness, hence a counter-measure such as subjecting the inner wall of that portion to surface treatment or press-fitting a bush made of steel in the inner wall, must be taken, thus not only increasing of weight, but also steps of a manufacturing process are made more complex and a manufacturing cost becomes expensive.

Likewise, at a slide contact portion of a cam where high fatigue strength, rigidity and abrasion-proofness are required, it is necessary to integrally join an abrasion-proof member formed of iron series sintered material, ceramics or the like with a base metal layer through a method of cast wrapping or the like. However, in the case where an abrasion-proof member is formed of iron series sintered material that is heavy in weight, since the associated location is remote from the center of rocking motion, a moment of inertia is large hence it brings about a result that is contrary to the inherent objects (reduction in weight and reduction in an inertial force) of the formation of a rocker arm of light alloy materials. In addition, in the case where an abrasion-proof member is formed of ceramics, while reduction in weight can be contemplated as compared to iron series sintered material, there is a possibility that at the boundary portion between a base metal layer and the ceramics, a stress due to a difference in a coefficient of thermal expansion would arise, and hence unfavorable phenomena such as deformation, cracking, peal-off at the boundary surface, etc. may be generated.

On the other hand, a piston made of light alloys is light in weight, has a small inertia, and so, is suitable for high speed rotation. However, since the light alloy materials are generally poor in heat-resistivity, recently a technique for dealing with this problem by associating a heat-resisting member such as ceramics with a head portion of a piston for a high speed engine through the method of screw setting, cast wrapping or the like, has been employed. But, due to a large difference in thermal expansion between the heat-resisting member and the light alloy material forming the piston main body, there exists a disadvantage that thermal stress would arise at the boundary portion between these member and material, hence unfavorable phenomena such as cracking, deformation, etc. would be generated, and the durability of the piston is lowered.

SUMMARY OF THE INVENTION

The present invention has been worked out under the above-mentioned technical background, and a principal object of the invention is to provide a fiber-reinforced metallic member in which shortcomings of materials at a boundary portion between a base metal layer and a reinforced layer have been eliminated.

Another object of the present invention is to realize improvements in strength (fatigue strength), rigidity and abrasion-proofness without bringing about increase of weight of a member made of light alloy.

This object can be achieved by producing a fiber shaped body having a low fiber volume proportion with powder having the same composition as a base metal or with powder consisting of principal components of the base metal and reinforcing a desired metallic member by means of the fiber shaped body.

Also, the above-mentioned object can be achieved by increasing a fiber volume proportion of a reinforced layer in the direction pointing away from the base metal layer.

The fiber-reinforced member according to the present invention is characterized in that it is reinforced by a fiber shaped body having a low fiber volume proportion which is produced by mixing inorganic fibers with powder having the same composition as a base metal to be reinforced or with powder consisting of principal components of the base metal and thereafter press-shaping the mixture, the particle diameter of the powder being chosen to be 1 to 20 times the diameter of the inorganic fibers.

According to another feature of the present invention, the layer that is reinforced by the fiber shaped body having a low fiber volume proportion is used as a boundary layer with a non-reinforced layer, and moreover, a fiber volume proportion in the entire reinforced layer is increasing in the direction pointing away from the non-reinforced layer.

The above-mentioned and other features of the present invention will become more apparent from perusal of the following description with reference to the accompanying drawings.

DETAILED DESCRIPTION OF THE INVENTION

Figure 1:
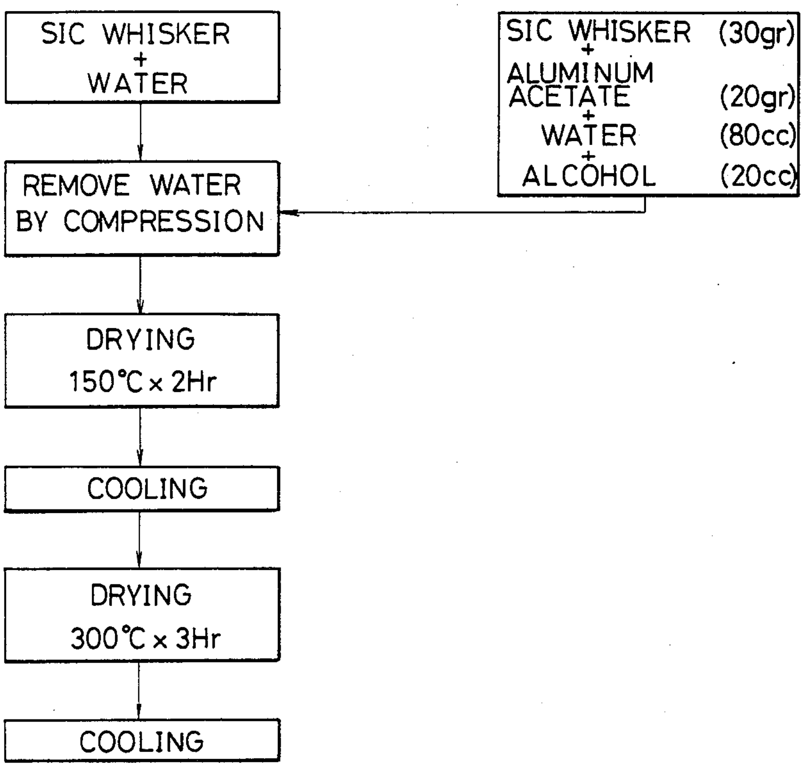
FIG. 1 is a production step diagram of a fiber shaped body well known in the prior art.

The inorganic fibers to be used according to the present invention include, for example, SiC fibers (0.1∼1 μm), C fibers (6∼7 μm) and $Al_2O_3$ fibers (1∼10 μm), and "the powder having the same composition as a base metal to be complex reinforced or powder consisting of principal components of the base metal" means, if the base metal consists of Al base alloy, powder of that alloy or pure Al powder, and if the base metal consists of Mg base alloy, then powder of that alloy or pure Mg powder.

In order to obtain a fiber shaped body having a low fiber volume proportion ($V_f$), powder having a particle diameter 1 to 20 times as large as a fiber diameter is used, the powder of the amount of 2 or more in volume ratio with respect to an amount of fibers is mixed with the fibers by employing water, alcohol, resin containing solution, etc. jointly as a binder, and after the mixture has been press-shaped into a desired configuration, the shaped mixture could be dried. Through this method of shaping, even a fiber shaped body having a fiber volume proportion of $V_f \leqq 5\%$ can be easily obtained.

Here, the reason why the powder particle diameter is limited to 1 to 20 times as large as the fiber diameter, is because if the magnification is lower than 1, the powder tends to aggregate in the gap spaces between the fibers, hence a fiber shaped body having a fixed fiber volume proportion ($V_f$) can be hardly obtained and uniform distribution of the fibers is difficult, and if the magnification exceeds 20-fold, then it becomes difficult to disperse the fibers uniformly.

In addition, the reason why the amount of use of the powder is limited to 2 or more in volume ratio, is because if the volume ratio is smaller than 2, then the fibers can be hardly dispersed uniformly, furthermore press-shaping characteristics are bad, and a mass-productivity is poor.

In a fiber-reinforced metal (FRM) in which reinforcement of matrix metal (base metal) is contemplated by making reinforcing fibers intervene in a metal matrix, as a proportion of intervening of fibers is increased, a strength is increased and a proportion of elongation thereof approaches to a proportion of elongation of the fibers. Therefore, it is possible to make the characteristics of the fiber-reinforced metal coincide with aimed values by varying a proportion of intervening of the fibers (a fiber volume proportion ($V_f$)).

However, in the event that a metallic member is locally fiber-reinforced with a high volume proportion of fibers, at the boundary portion between a base metal layer and a complex reinforced layer, the characteristics of the metallic member would change abruptly, and hence practically unfavorable phenomena are liable to occur. For instance, paying attention to coefficients of thermal expansion, in contrast to the fact that a coefficient of thermal expansion of Al-alloy is about $22\times10^{-6}/°C.$, that of $Al_2O_3$ is $7.7\times10^{-6}/°C.$, that of SiC is $3.1\times10^{-6}/°C.$, and a coefficient of thermal expansion of inorganic fibers is very small compared with Al-alloy, so that if the metallic member is subjected to large thermal change, then a large difference in thermal expansion would occur between the base metal layer and the complex reinforced layer depending upon a content proportion in volume of fibers, and there is a possibility that cracks may arise in the boundary portion between the respective layers.

For the purpose of avoiding such abrupt changes in characteristics, the procedure that in the portion adjacent to the base metal layer, a fiber volume proportion ($V_f$) of the complex reinforced layer is set low, then the fiber volume proportion ($V_f$) is increased towards a surface layer and a sufficiently high abrasion-proofness is given to the surface of the metallic member, is effective. According to this procedure, there is no need to make a material having a low coefficient of thermal expansion such as invar steel intervene at the boundary portion between the reinforced layer and the base metal layer, and a fiber-reinforced metallic member can be obtained at a relatively cheap manufacturing cost.

Here, if it is intended to set a fiber volume proportion ($V_f$) of the reinforced layer abjacent to the base metal layer at a sufficiently low value of 10% or less, then manufacture and maintenance in shape of a fiber shaped body for complexed casting use would become difficult, and therefore, the inventors of this invention decided to form a fiber shaped body by mixing powders made of alloy material forming the base metal or made of principal components of the base metal with the reinforcing inorganic fibers. In the case of the fiber shaped body having a low fiber volume proportion manufactured through the above-mentioned process, collapse in shape upon handling as well as deformation upon carrying out complexed casting would hardly occur, and so, a reinforced member which can always maintain the material property of the reinforced layer good and has a stable quality, can be provided.

It is to be noted that while a surface layer of a reinforced layer, which makes slide contact with another member under a large pressure, must have its fiber volume proportion ($V_f$) chosen to be high, it is possible to give it properties corresponding to desired characteristics such as improving abrasion-proofness, rigidity and fatigue-reinforcement by adding powder of the same material as the inorganic fibers for reinforcement, inorganic fibers or powder of different kinds of materials or powder of alloys having excellent abrasion-proofness thereto and mixing them to change the material. For instance, in the case of reinforcing a head portion of a piston, it is possible to enhance a heat-insulating effect by adding powder having an excellent heat-insulating property such as zirconia, titania or the like into the fiber shaped body.

DESCRIPTION OF THE PREFERRED EMBODIMENTS

Embodiment 1

Figure 2:
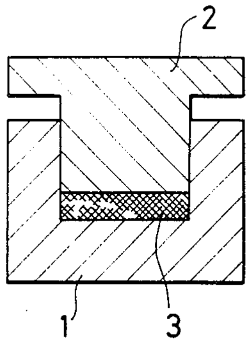
FIG. 2 is a schematic cross-sectional view showing a mode of press-shaping a fiber shaped body according to Embodiment 1 of the present invention.

SiC whiskers (diameter: 0.1~1.0 μm) and JIS AC4D material ground powder (particle diameter: 0.45 μm) were mixed at a mixing ratio of 1:9 jointly with a binder, the mixture was charged in a mold hole of a metal mold 1 shown in FIG. 2, then it was pressed with a plunger 2, and a fiber shaped body 3 of $V_f$=4% was obtained. This fiber shaped body 3 was preheated within the atmosphere under the condition of a temperature of 600° C. and a heating time of 30 minutes, then it was placed within a metal mold for casting that had been heated to 300°~400° C., molten base metal JIS AC4D material at a temperature of 800° C. was poured into the mold and solidified under a pressure of 1000 Kg/cm$^2$, and thereby a fiber-reinforced metallic member consisting of a base metal layer and a reinforced layer was obtained.

During the casting work, collapse in shape of the fiber shaped body 3 would not arise, and results of a plane bending fatigue test (at the room temperature) for a test piece cut out from a reinforced layer after the fiber-reinforced metallic member was subjected to artificial age treatment subsequent to solid solution treatment (T6 treatment), were also satisfactory. In addition, a coefficient of themal expansion of the reinforced layer is about $21\times10^{-6}$/°C. at 20°~100° C., its difference from a coefficient of thermal expansion of the base metal layer of $22.3\times10^{-6}$/°C. is small, and so, it is obvious that a large difference in thermal expansion at the boundary portion would not occur.

Embodiment 2

Figure 3:
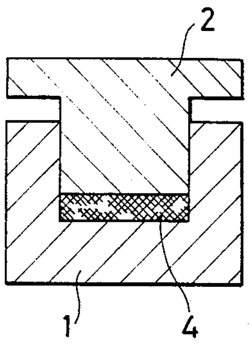
FIGS. 3 to 5 are schematic cross-sectional views showing a mode of press-shaping a fiber shaped body according to Embodiment 2 of the present invention.

Only SiC whiskers (diameter: 0.1~1.0 μm) were charged in a mold hole of a metal mold 1 jointly with a binder, then it was press-shaped with a plunger 2 as shown in FIG. 3, and a fiber sub-shaped body 4 or $V_f$=20% was obtained.

Figure 4:
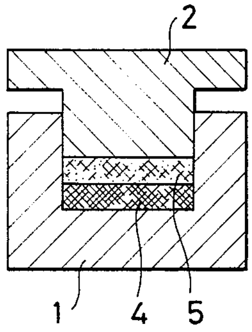

Subsequently, SiC whiskers (diameter: 0.1~1.0 μm) and JIS AC4D material ground powder (particle diameter: 0.45 μm) were mixed as divided into two kinds, one being mixed at a volume ratio of 5:5, the other being mixed at a volume ratio of 1:9, jointly with a binder, the mixture of the volume ratio of 5:5 was additionally charged in the mold hole of the metal mold 1, then it was press-shaped with the plunger 2, and a fiber sub-shaped body 5 of $V_f$=10% was obtained as superposed on the fiber sub-shaped body 4 as shown in FIG. 4.

Figure 5:
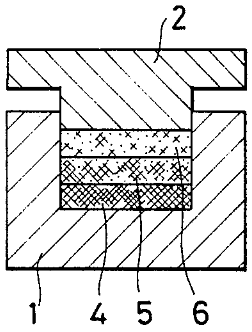

Then, the mixture of the volume ratio of 1:9 was press-shaped with the metal mold 1 and the plunger 2, and a fiber sub-shaped body 6 of $V_f$=4% was obtained as superposed on the fiber sub-shaped body 5 as shown in FIG. 5.

Figure 6:
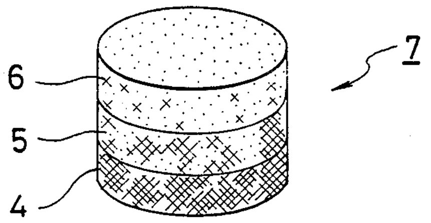
FIG. 6 is a perspective view of the fiber shaped body produced according to Embodiment 2.

Thus, a fiber shaped body 7 formed of three layers of sub-shaped bodies as superposed on one another (See FIG. 6) was preheated within the atmosphere under the condition of a temerature of 600° C. and a heating time of 30 minutes, then it was placed within a metal mold for casting that had been heated to 300°~400° C., molten base metal JIS AC4D material at a temperature of 800° C. was poured into the mold and solidified under a pressure of 1000 kg/cm$^2$, and thereby a fiber-reinforced metallic member consisting of a base metal layer and a reinforced layer was obtained.

During the casting work, collapse in shape of the fiber shaped body 7 did not arise.

Figure 7:
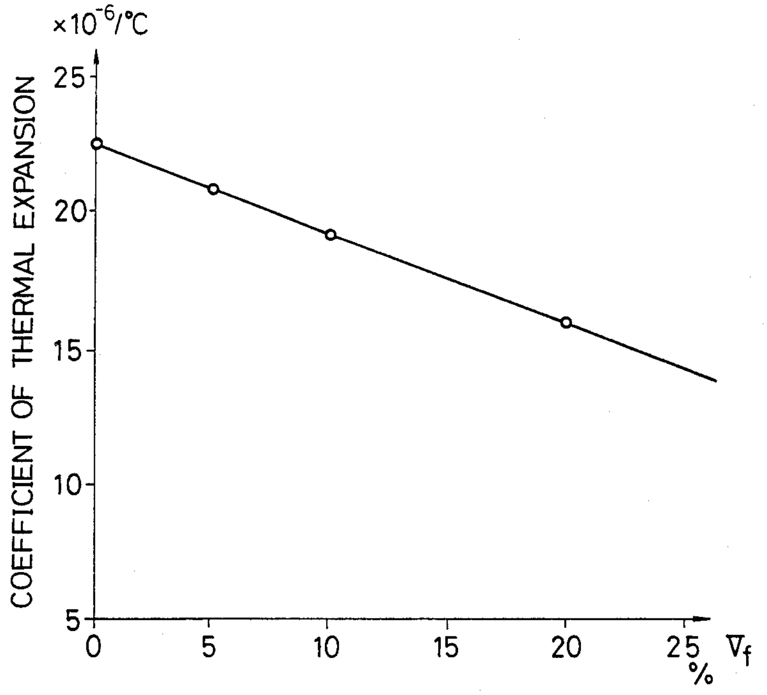
FIG. 7 is a diagram showing a coefficient of thermal expansion of a reinforcing layer in a fiber-reinforced metallic member in which the fiber shaped body is complexed.

Also, a coefficient of thermal expansion of the reinforced layer becomes small as the fiber volume proportion $V_f$ increases as shown in FIG. 7, thus since the coefficient of thermal expansion of the reinforced layer adjacent to the base metal layer is sufficiently close to that of the base metal layer, it is obvious that a large difference in thermal expansion at the boundary portion would not occur, and moreover, since the fiber volume proportion ($V_f$) of the reinforced layer itself changes in a stepwise manner, change of a difference in thermal expansion would not arise abruptly.

Figure 8:
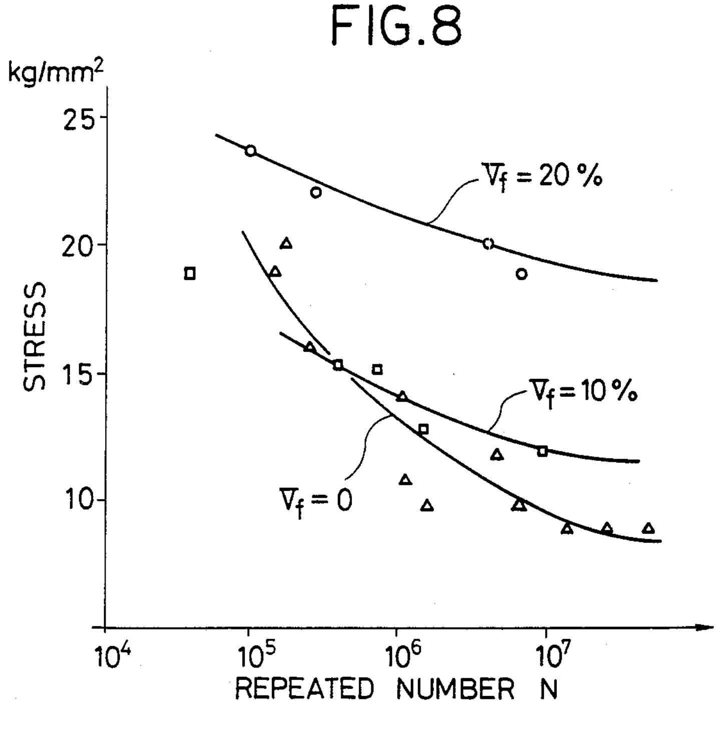
FIG. 8 is a diagram showing results of a plane bending fatigue test for the same.

Furthermore, the fiber reinforced member was subjected to the T6 treatment, plane bending fatigue tests (at the room temperature) were conducted by making use of test pieces cut out from the respective layers of $V_f$=0, $V_f$=10% and $V_f$=20%, and the results shown in FIG. 8 were obtained.

With reference to FIG. 8, while the layer of $V_f$=20% is greatly reinforced, the strength of the layer of $V_f$=10% is close to the strength of the base metal layer, and it is seen that even under a repeatedly increased and decreased force, the boundary portion therebetween is safe.

Embodiment 3

Figure 9:
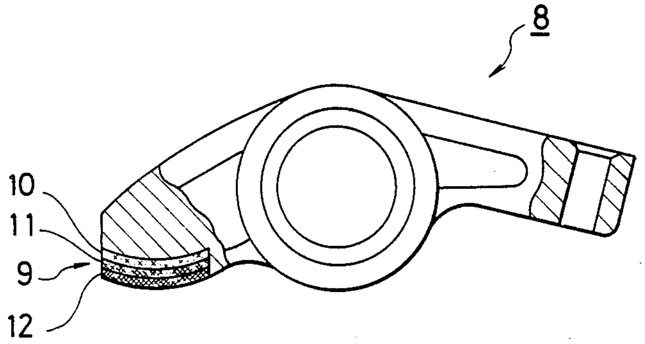
FIG. 9 is a front view with an essential part cut away of a rocker arm according to Embodiment 3 of the present invention.

FIG. 9 shows a rocket arm 8 made of aluminum alloy (JIS AC4D material) for use in an overhead cam shaft type valve moving mechanism in a front view with an essential part cut away, and a cam slide contact portion 9 of the rocker arm 8 is formed as a reinforced layer making use of SiC whiskers. In more particular, the cam slide contact portion 9 is formed as a reinforced layer consisting of a first layer 10 contiguous to a base metal layer, a second layer 11 forming an intermediate layer and a third layer 12 having a cam slide contact surface. The characteristics of these respective layers are as follows:

(1) First Layer 10

This layer is a layer reinforced by means of a fiber shaped body of $V_f=5\%$ that was formed by mixing SiC whiskers and Al-alloy powder (JIS AC4D material) at a volume ratio of 2:8, and a coefficient of thermal expansion of this layer has a value sufficiently close to that of the base metal layer, as shown in FIG. 7.

(2) Second Layer 11

This layer is a layer reinforced by means of a fiber shaped body of $V_f=10\sim20\%$ that was formed of SiC whiskers only, and a coefficient of thermal expansion of this layer has a smaller value than that of the first layer, as shown in FIG. 7.

(3) Third Layer 12

This layer is a layer reinforced by means of a fiber shaped body of $V_f$ (powder being deemed also as fibers)$=20\sim50\%$ that was formed by mixing SiC whiskers and SiC powder at a volume ratio of 1:1 and having good abrasion-proofness, and a coefficient ofthermal expansion of this layer has a smaller value than that of the second layer. In addition, it is effective to give self-lubricity to this layer by further adding carbon powder to the fiber shaped body.

<Process for making the rocker arm 8>

At first, SiC whiskers and SiC powder are mixed together at a mixing volume ratio of 1:1 jointly with a binder, then the mixture is charged within a metal mold and pressed with a plunger similarly to the case of Embodiment 2, and thereby a first fiber sub-shaped body of $V_f=20\sim50\%$ is formed.

Subsequently, SiC whiskers are additionally charged within the metal mold jointly with a binder, then they are press-shaped with the plunger, and thereby a second fiber sub-shaped body of $V_f=10\sim20\%$ is formed as superposed on the first fiber sub-shaped body.

Furthermore, SiC whiskers and Al-alloy powder (JIS AC4D material) are mixed together at a mixing volume ratio of 2:8 jointly with a binder, and thereby a third fiber sub-shaped body of $V_f=5\%$ is formed as superposed on the second fiber sub-shaped body.

The thus obtained fiber shaped body consisting of a three-layer superposed body is preheated within the atmospher under the condition of a temperature of 600° C. and a heating time of 30 minutes, then the fiber shaped body is placed within a metal mold for casting a rocker arm that has been heated to 300°~400° C. so that the third fiber sub-shaped body may be positioned on the side of the base metal layer in the casting, molten base metal (JIS AC4D material) at a temperature of 800° C. is poured into the metal mold, and is solidified as pressed under a pressure of 1000 $Kg/cm^2$, and thereby a rocker arm 8 provided with a cam slide contact portion 9 consisting of a reinforced layer, can be obtained.

According to the above-described process for making, during the casting work, collapse in shape of the fiber shaped body would not arise, further it is obvious that a large difference in thermal expansion at the boundary portion would not occur because a coefficient of thermal expansion of the first layer 10 is sufficiently close to that of the base metal, and moreover, in the reinforced layer itself, since the fiber volume proportion ($V_f$) varies in a stepwise manner, chang of a difference in thermal expansion is not abrupt.

Therefore, the light-weighted rocker arm 8 according to the above-described embodiment is provided with a cam slide contact surface presenting an excellent abrasion-proofness, and in use, since unfavorable phenomena such as cracking, pealing-off, etc. at the boundary portion between the complex reinforced layer and the base metal layer would not arise, a durability of the rocker arm is very good.

Embodiment 4

Figure 10:
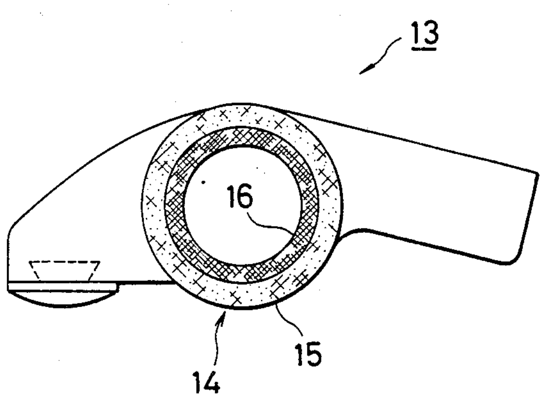
FIG. 10 is a front view with an essential part cut away of a rocker arm according to Embodiment 4 of the present invention.

FIG. 10 illustrates a rocker arm 13 made of aluminum-alloy (JIS AC4D material) for use in an overhead cam shaft type valve moving mechanism in a front view with an essential part cut away, in which a shaft fitting portion 14 is formed as a reinforced layer making use of SiC whiskers. More particularly, the shaft fitting portion 14 is formed as a reinforced layer consisting of a first layer 15 contiguous to a base metal layer and a second layer 16 forming an inner layer. The characteristics of the respective layers 15 and 16 are as follows:

(1) First Layer 15

This layer is a layer reinforced by means of a fiber shaped body of $V_f=2\sim10\%$ that was formed by mixing SiC whiskers and Al-alloy powder (JIS AC4D material) at a volume ratio of 2:8, and a coefficient of thermal expansion of this layer has a value sufficiently close to that of the base metal layer, as shown in FIG. 7.

(2) Second Layer 16

Figure 11:
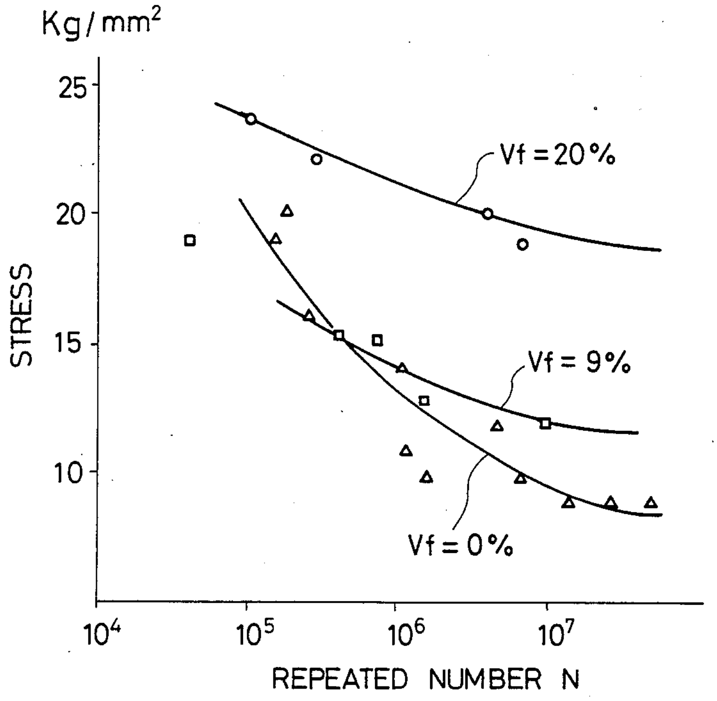
FIG. 11 is a diagram similar to FIG. 8, which shows results of a plane bending fatigue test for a reinforced layer in the same rocker arm.

This layer is a layer reinforced by means of a fiber shaped body of $V_f=10\sim30\%$ that was formed by adding high Si-Al alloy powder (JIS ADC12 material . . . 12% Si) to SiC whiskers at a volume proportion of 5~6% and having good abrasion-proofness, and a coefficient of thermal expansion of this layer has a small value than that of the first layer. It is to be noted that the high Si-Al alloy powder (JIS ADC12 material) contributes to improvement in abrasion-proofness of the second layer 16 and also it contributes to improvement in a strength at the boundary surface between the SiC whiskers and the base metal (matrix metal), hence in use, generation of cracks can be prevented, and improvements in durability of a rocker arm can be achieved. After the rocker arm 13 having the above-described structure had been subjected to T6 treatment, plane bending fatigue tests (at the room temperature) were conducted by making use of test pieces cut away respectively from the base metal layer ($V_f=0\%$), the first layer 15 ($V_f=9\%$) and the second layer 16 ($V_f=20\%$), and results similar to those shown in FIG. 8 were obtained. With reference to FIG. 11, it can be seen that while the layer of $V_f=20\%$ is greatly reinfocced, a strength of the layer of $V_f=9\%$ is close to a strength of the base metal layer, and even under a repeatedly exerted force, the boundary portion is safe.

<Process for making the rocker arm 13>

At first, high Si-Al alloy powder (JIS ADC12 material) is added to SiC whiskers at a volume porportion of 5~6%, they are mixed together jointly with a binder, then the mixture is charged within a metal mold and press-shaped into an annular shape, and thereby a fiber sub-shaped body of $V_f = 20\%$ is formed.

Subsequently, a fiber sub-shaped body of $V_f = 9\%$ that is to be formed by mixing SiC whiskers and Al-alloy powder (JIS AC4D material) at a volume ratio of 2:8, is formed as superposed around the outer circumference of the previously formed fiber sub-shaped body of $V_f = 20\%$. It is to be noted that the sequence of shaping of the fiber sub-shaped bodies can be made opposite to the above-described sequence. However, the positional relationship between the respective fiber sub-shaped bodies cannot be changed.

The thus obtained fiber shaped body consisting of a double layer superposed body, is preheated within the atmosphere under the condition of a temperature of 600° C. and a heating time of 30 minutes, then the fiber sub-shaped bodies are placed within a metal mold for use in casting of the rocker arm that was heated to 300°~400° C., molten base metal (JIS AC4D material) at a temperature of 800° C. is poured into the metal mold, and solidified as pressed under a pressure of 1000 kg/cm$^2$, and thereby the rocker arm 13 provided with the shaft fitting portion 14 which is formed of a reinforced layer can be obtained.

According to the above-described process for manufacture, during the manufacturing work, collapse in shape of the fiber shaped body would not arise, further it is obvious that a large difference in thermal expansion at the boundary portion would not occur because a coefficient of thermal expansion of the first layer 15 is sufficiently close to that of the base metal layer, and moreover, in the reinforced layer itself, since the fiber volume proportion ($V_f$) varies in a stepwise manner, change of a difference in thermal expansion is not abrupt.

Therefore, the light-weighted rocker arm 13 according to the above-described embodiment is provided with a rocker arm shaft slide contact surface presenting excellent abrasion-proofness and a sufficiently large fatigue strength, and in use, since unfavorable phenomena such as cracking, pealing-off, etc. at the boundary portion between the complex reinforced layer and the base metal layer would not arise, a durability of the rocker arm is very good.

Embodiment 5

Figure 12:
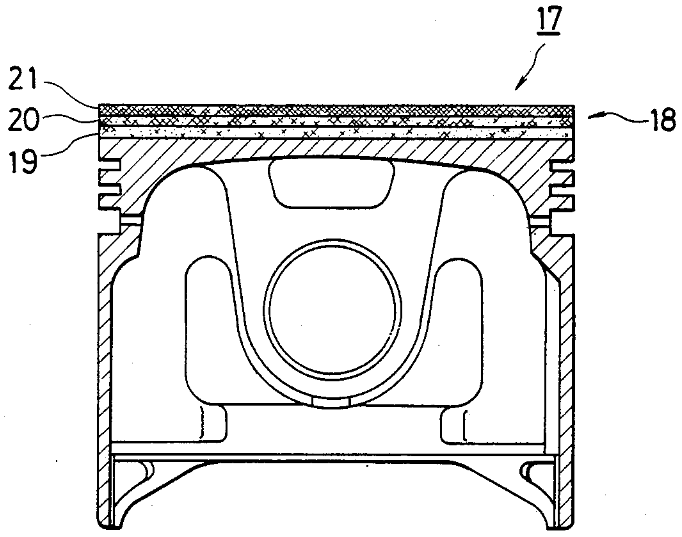
FIG. 12 is a longitudinal cross-sectional view of a piston according to Embodiment 5 of the present invention.

FIG. 12 shows a piston made of aluminium alloy (JIS AC8B material) in longitudinal cross-section, in which a head portion 18 is formed as a reinforced layer making use of inorganic fibers. More particularly, the head portion 18 is formed as a reinforced layer consisting of a first layer 19 contiguous to a base metal layer, a second layer 20 covering the first layer 19 and a third layer 21 covering the second layer 20. The characteristics of the respective layers 19, 20 and 21 are as follows:

(1) First Layer 19:

This layer is a layer reinforced by means of a fiber shaped body of $V_f = 2 \sim 10\%$ that was formed by mixing heat-insulating short fibers (for example, $Al_2O_3$ fibers), Al powder or Al-alloy (JIS AC8B material) powder satisfying the condition of [powder particle diameter]/[fiber diameter] $= 1 \sim 20$ so as to fulfill the condition of [powder amount(volume)]/[fiber amount(volume)] $\geqq 2$, and a coefficient of thermal expansion of the layer has a value close to that of the base metal layer as shown in FIG. 7.

(2) Second layer 20:

This layer is a layer reinforced by means of a fiber shaped body of $V_f = 10 \sim 20\%$ that was formed of heat-insulating short fibers (for example, $Al_2O_3$ fibers), and a coefficient of thermal expansion of the layer is smaller than that of the first layer 19 as shown in FIG. 7.

(3) Third Layer 21:

This layer is a layer reinforced by means of a fiber shaped body of $V_f = 20\%$ that was formed by mixing heat-insulating short fibers (for example, $Al_2O_3$ fiber) and heat-insulating powder (for example, zirconia or titania) at a mixing ratio of 1:1 to 1:1.5, and a coefficient of thermal expanstion of the layer is smaller than that of the second layer 20 as shown in FIG. 7.

<Process for making the piston 17>

At first, $Al_2O_3$ short fibers and heat-insulating powder (for example, zirconia or titania) are mixed together at a volume ratio of 1:1 jointly with a binder, then the mixture is charged within a metal mold, and thereby a fiber sub-shaped body of $V_f = 20\%$ is formed.

Subsequently, $Al_2O_3$ short fibers are additionally charged within the metal mold jointly with a binder, and thereby a fiber sub-shaped body of $V_f = 14\%$ is formed as superposed on the above-described already formed fiber sub-shaped body.

Furthermore, $Al_2O_3$ short fibers and Al-alloy powder (JIS AC8B material) satisfying the condition of [powder particle diameter]/[fiber diameter] $= 1 \sim 20$ are mixed together at a volume ratio ([powder particle diameter]/[fiber diameter]) $\geqq 2$ jointly with a binder, the mixture is additionally charged within the metal mold, and thereby a fiber sub-shaped body of $V_f = 5\%$ is formed as superposed on the already formed fiber sub-shaped body of $V_f = 14\%$.

The thus obtained fiber shaped body consisting of a three-layer superposed body is preheated within the atmospher under the condition of a temperature of 600° C. and a heating time of 30 minutes, then the fiber shaped body is placed within a metal mold for casting a piston that was heated to 300°~400° C. so that the fiber sub-shaped body of $V_f = 5\%$ may be positioned on the side of the base metal layer of the casting, molten base metal (JIS AC8B material) at a temperature of 800° C. is poured into the metal mold, and is solidified as pressed under a pressure of 1000 Kg/cm$^2$, and thereby a piston 17 provided with a head portion 18 consisting of a reinforced layer can be obtained. This piston 17 is subjected to stabilizing treatment subsequent to solid solution treatment (T7 treatment), and then it is used.

According to the above-described process for manufacture, during the manufacturing work, collapse in shape of the fiber shaped body would not arise, further it is obvious that a large difference in thermal expansion at the boundary portion would not occur because a coefficient of thermal expansion of the first layer 19 is sufficiently colse to that of the base metal layer, and moreover, in the reinforced layer itself, since the fiber volume proportion ($V_f$) varies in a stepwise manner, change of a difference in thermal expansion is not abrupt.

Therefore, the light weight piston 17 according to the above-described embodiment has a head top surface presenting excellent heat-insulating property, and in use, since unfavorable phenomena such as cracking, pealing-off, etc. at the boundery portion between the complex reinforced layer and the base metal layer would not arise, a durability of the piston is very good.

Furthermore, it is also possible that the first layer 19 at the above-described head top portion 18 is formed as divided into two sub-layers, the sub-layer on the side of the base metal layer is reinforced by means of a fiber sub-shaped body of $V_f=2\sim5\%$ produced by mixing powder and fibers at a volume ratio ([powder amount]/[fiber amount]) of 9, and the sub-layer on the side of the second layer 20 is reinforced by means of a fiber sub-shaped body of $V_f=5\sim10\%$ produced by mixing powder and fibers at a volume ratio of 1.

As will be apperent from the above description, in the fiber-reinforced metallic member according to the present invention, since a reinforced layer making use of a fiber shaped body heving a low fiber volume proportion that is formed by mixing powder having the same composition as the base metal or powder consisting of principal components thereof, is placed adjacent to the base metal layer, abrupt change of the characteristics of the materials at the boundary portion between the complex reinforced layer and the base metal layer is not present, and so, practically, disadvantages such as cracking or the like would not arise at that portion.

In addition, according to another preferred embodiment of the present invention, since a fiber volume proportion of the fiber-reinforced layer is lowered in a stepwise manner from the suface layer towards the inner layer, abrupt change of the characteristics of the material at the boundary portion between the complex reinforced layer and the base metal layer is not present, and so, practically, disadvantages such as cracking, pealing-off, etc. would not arise at that portion.

What is claimed is:

1. A fiber-reinforced metallic member comprising a metallic member which is cast to a reinforcing shaped body with fibers having a low fiber volume proportion, said shaped body being formed by mixing inorganic fibers with powder having the same composition as a base metal to be reinforced or with powder consisting of the principal components of the base metal and thereafter compressing and shaping the mixture, the particle diameter of said powder being 1 to 20 times as large as a diameter of said particles.

2. A fiber-reinforced metallic member as claimed in claim 1, further characterized in that a fiber volume proportion of said fiber shaped body is 2 to 10%.

3. A fiber-reinforced metallic member as claimed in claim 1, further characterized in that the fibers and the powder forming said fiber shaped body fulfil the condition of:

[powder amount(volume)]/[fiber amount(volume)] $\geqq$ 2.

4. A fiber-reinforced metallic member comprising a cast metallic member which is reinforced by a shaped body with fibers which includes, as a boundary layer between the shaped body and a base metal layer, a shaped layer having a low fiber volume proportion which is formed by mixing inorganic fibers with powder having the same composition as the base metal to be reinforced or with powder consisting of principal components of the base metal, and thereafter compressing and shaping the mixture, a particle diameter of said powder being chosen to be 1 to 20 times as large as a diameter of said inorganic fibers, and a fiber volume proportion of said reinforced layer increases in the direction pointing away from the base metal layer.

5. A fiber-reinforced metallic member as claimed in claim 4, further characterized in that a fiber volume proportion of said shaped body is 2 to 10%.

6. A fiber-reinforced metallic member as claimed in claim 4, further characterized in that the fibers and the powder forming said shaped body fulfil the condition of:

[powder amount(volume)]/[fiber amount(volume)] $\geqq$ 2.

7. A fiber-reinforced metallic member as claimed in claim 4, further characterized in that a surface layer of said base metal layer is reinforced by means of a shaped body having a high fiber volume proportion, which is formed by mixing inorganic powder having a good heat insulating property and inorganic fibers.

8. A fiber-reinforced metallic member as claimed in claim 4, further characterized in that a surface layer of said base metal layer is reinforced by means of a shaped body having a high fiber volume proportion, which is formed by mixing metal powder having a good abrasion-resistance and inorganic fibers.

9. A cast structural metallic member which is partially reinforced by means of a shaped body of fibers having a low fiber volume proportion, which is formed by mixing inorganic fibers with powder having the same composition as components of the base metal and thereafter compressing and shaping the mixture, a particle diameter of said powder being 1 to 20 times as large as the diameter of said inorganic fibers.

10. A structural metallic member characterized in that a cast metallic member is reinforced by a shaped body containing fibers and having a low fiber volume proportion, said shaped body being formed by mixing inorganic fibers with powder having the same composition as a base metal to be reinforced or with powder consisting of principal components of the base metal and thereafter compressing and shaping the mixture, a particle diameter of said powder being chosen to be 1 to 20 times as large as a diameter of said inorganic fibers.

* * * * *